O. H. SPENCER & F. J. OAKES.
CHAIN ASSEMBLING MACHINE.
APPLICATION FILED APR. 24, 1916.
1,256,945.
Patented Feb. 19, 1918.
2 SHEETS—SHEET 1.
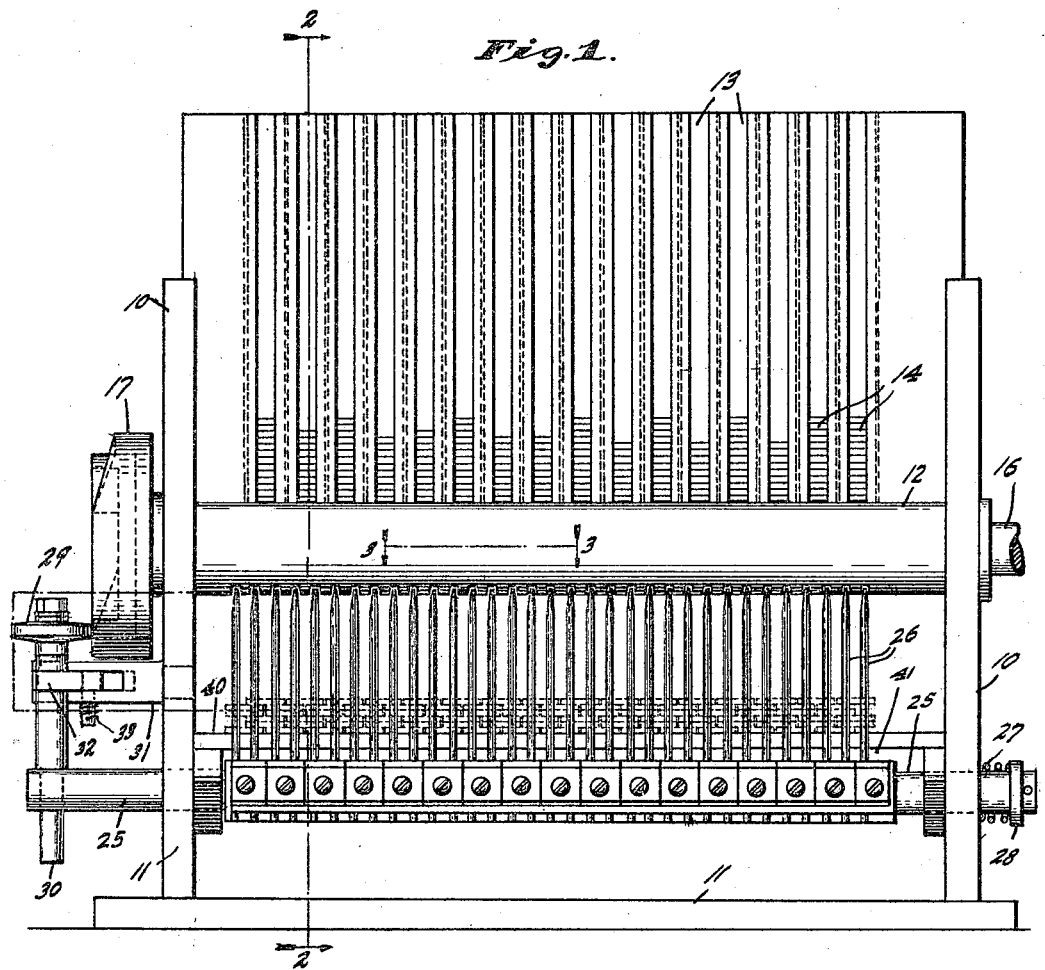
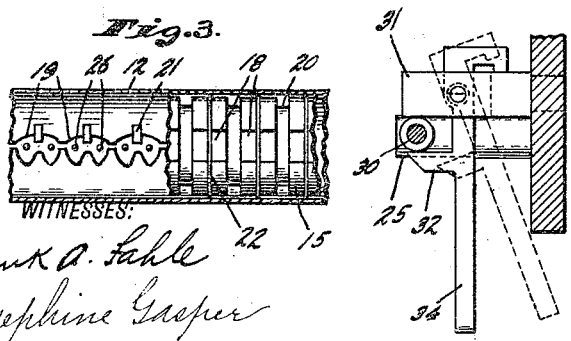
INVENTORS
Owen H. Spencer,
Frank J. Oakes,
BY
Hood & Schley
ATTORNEYS O. H. SPENCER & F. J. OAKES.
CHAIN ASSEMBLING MACHINE.
APPLICATION FILED APR. 24, 1916.
1,256,945.
Patented Feb. 19, 1918.
2 SHEETS—SHEET 2.
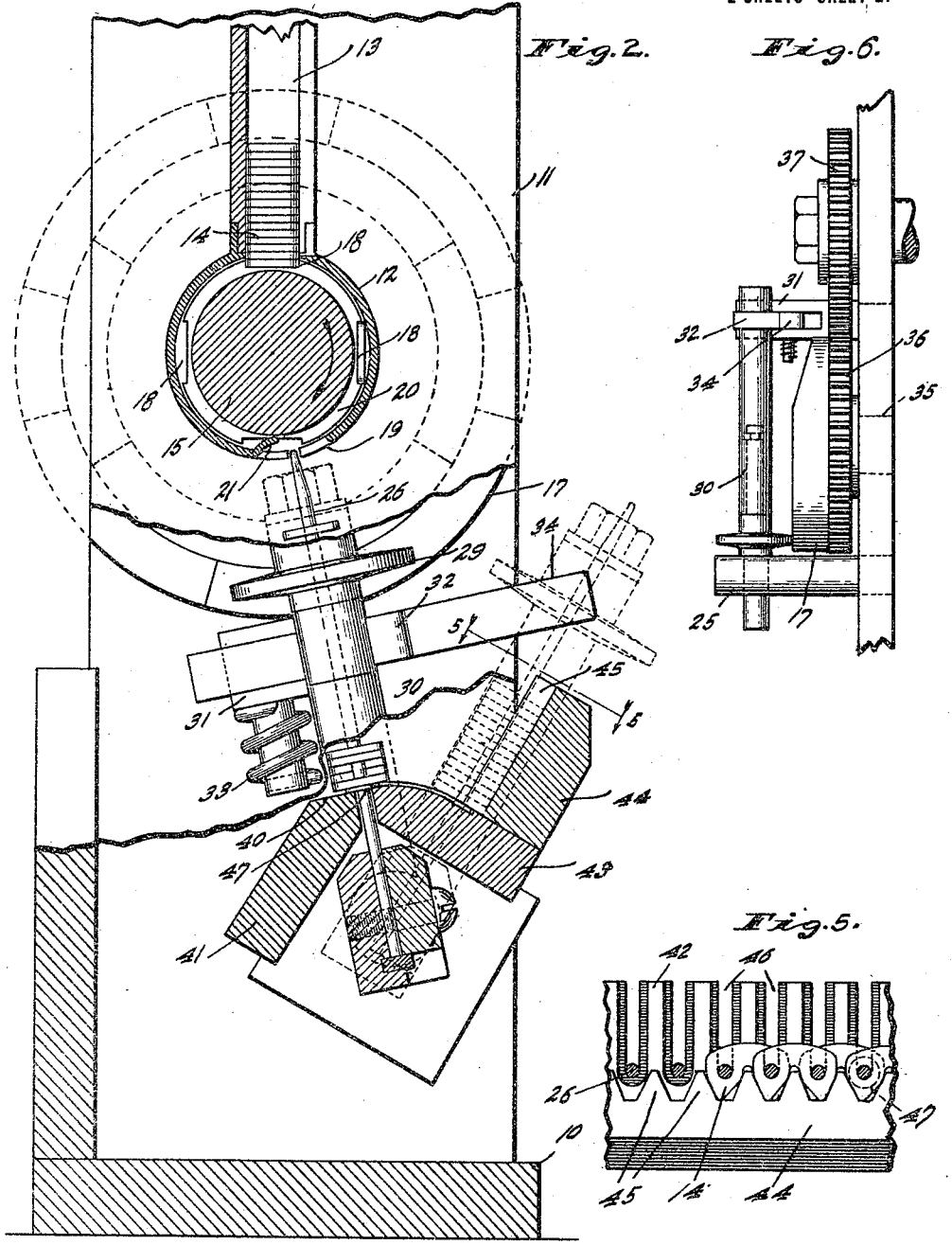
WITNESSES:
Frank A. Sahle
Josephine Gasper
INVENTORS
Owen H. Spencer,
Frank J. Oakes,
BY
Hood & Schley
ATTORNEYS

UNITED STATES PATENT OFFICE.

OWEN H. SPENCER AND FRANK J. OAKES, OF INDIANAPOLIS, INDIANA, ASSIGNORS TO LINK-BELT COMPANY, OF CHICAGO, ILLINOIS, A CORPORATION OF ILLINOIS.

CHAIN-ASSEMBLING MACHINE.

1,256,945.  Specification of Letters Patent.  Patented Feb. 19, 1918.

Application filed April 24, 1916. Serial No. 93,325.

*To all whom it may concern:*

Be it known that we, OWEN H. SPENCER and FRANK J. OAKES, citizens of the United States, residing at Indianapolis, in the county of Marion and State of Indiana, have invented a new and useful Chain-Assembling Machine, of which the following is a specification.

In the manufacture of silent chains, it has heretofore been necessary to assemble the chain by placing the links in position manually, so that it was necessary to handle each link individually. This required great labor and expense.

It is the object of our present invention to provide means for assembling a silent chain automatically.

The accompanying drawings illustrate our invention. Figure 1 is a front elevation of an assembling apparatus embodying our invention; Fig. 2 is an enlarged end elevation thereof, partly in section on the line 2—2 of Fig. 1, indicating in dotted lines the assembling comb tilted forward to permit removal of the assembled chain section; Fig. 3 is a partial section on the line 3—3 of Fig. 1, with part of the link-placing cylinder broken away to show the link-discharge openings in this cylinder casing; Fig. 4 is a detail of the latching mechanism for permitting tilting of the assembling comb when desired; Fig. 5 is a partial section on the line 5—5 of Fig. 2; and Fig. 6 is a detail of a modified form of construction of the reciprocating mechanism, for facilitating changing of the link groupings in the finished chain.

Mounted between the end pieces 10 of a suitable frame 11 is a horizontal cylindrical casing 12 on which is mounted a series of magazines 13 for silent chain links. These magazines are conveniently vertical, and each is of such size that it can receive within it a pile of silent chain links 14 with the links arranged flatwise one on top of the other with their respective link points and pitch holes all registering and the link points all pointing in the same direction—to the left in Fig. 2. The mechanism for getting the links in this side-by-side arrangement forms the subject-matter of other inventions. The magazines are spaced apart so that the distance from center to center of adjacent magazines is equal to twice the pitch of the chain. A horizontal cylinder 15 fits rotatably within the casing 12, being suitably supported for rotation and provided at one end with a shaft extension 16 for operating it, and at the other with a cam plate 17 which will be described later. The shaft extension 16 may be provided with any suitable operating mechanism, manual or power.

The cylinder 15 has a circumferential series of pockets 18 for each magazine 13, there being any desired number of these pockets for each magazine, four being shown in Fig. 2. The casing 12 is cut away at the top beneath the magazines 13 to allow the links 14 to drop from these magazines 13 into these pockets 18 as they come under these magazines during the rotation of the cylinder 15, and is provided near the bottom with a link-shaped discharge opening 19 for each circumferential series of pockets 18, for discharging from such pockets the links which they have received from the magazines 13. To assist in this discharge, the cylinder 15 is provided with a groove 20 at each series of pockets 18, this groove being in the plane of the crotch of the links in such series of pockets, and a discharging finger 21, conveniently formed integral with the casing 12, projects into each groove 20 so as to engage the link 14 in each pocket 18 as such link approaches the discharge opening 19 and by a cam action force such link out through such opening. The pockets 18 are conveniently formed by longitudinal grooves in the cylinder 15, and split rings 22 mounted in circumferential grooves in such cylinder; and may be of proper depth to receive one or more links 14, as desired, being shown as just deep enough to receive one link.

A rock shaft 25 is also mounted between the end pieces 10, and parallels the cylinder 15, being below and slightly forward of such cylinder, as clear from Fig. 2. The shaft 25 has removably mounted upon it a number of parallel, upwardly projecting slide bars or stack rods 26, the number of which is one more than twice the number of magazines 13, these slide bars or stack rods having their upper ends free and being spaced apart from center to center by distances equal to the pitch of the chain or one-half the distance from center to center of adjacent magazines 13. These stack rods 26 and the rock shaft 25 together form the assembling comb. This assembling comb is shiftable axially a distance equal to the pitch of the chain, or to the spacing from center to center of adjacent stack rods 26, being spring-pressed to the right (Fig. 1) by a spring 27 acting between one of the end pieces 10 and a collar 28 on the rock shaft 25, and being shiftable to the left against the action of the spring 27 by the action of the cam plate 17 on a roller 29 carried by a transverse pin 30 on the left hand end of the rock shaft 25. The effective height of the cams of the cam plate 17 is equal to the pitch of the chain, or to the spacing from center to center of adjacent stack rods 26. Conveniently the roller 29 has the hub portions of its two ends of different axial lengths, and is axially reversible so that it may be brought into position to coöperate with either the inner or the outer sets of cams on the cam plate 17, as shown in Figs. 2 and 1 respectively, the outer set having two high and two low portions and the inner set one high and one low portion in the arrangement illustrated. The transverse pin 30 is slidably guided by a lateral pin 31 from the left hand end piece 11 and a latch 32 pivoted on such lateral pin 31, the latch 32 being spring-pressed in a clockwise direction (Fig. 4) by a coil spring 33 about its pivot pin and being provided with a handle 34 by which it can be moved against such spring 33 to release such transverse pin 30 and allow the rock shaft 25 and its assembling comb to be tilted forward, or from the full line to the dotted line position in Fig. 2.

The free ends of the slide bars or stack rods 26 of the assembling comb project radially toward the axis of the cylinder 15 through the discharge openings 19 of the casing 12 when the rock shaft 25 and assembling comb are tilted backward, or to their full line position in Fig. 2; and the various stack rods are in alinement with the pitch holes of the links discharged through the discharge openings 19 when the rock shaft 25 is at either limit of its axial movement, save that the stack rod farthest to the left is out of registry when the rock shaft is shifted to the left and the farthest to the right one when it is shifted to the right. The discharge openings 19 are all interconnected to allow the passage of the stack rod ends from one discharge opening to another when the assembling comb is shifted. By the axial shifting of the rock shaft 25, the links 14 from any magazine 13 and its corresponding series of pockets 18 may be discharged on to either of two pairs of stack rods, one stack rod being common to the two pairs; for example, the links from the second magazine 13 from the right and its series of pockets 18 will be discharged on to the third and fourth stack rods 26 when the rock shaft 25 and assembling comb are shifted to the left (as indicated in Fig. 1) and will be discharged on to the fourth and fifth stack rods 26 when the rock shaft 25 and assembling comb are shifted to the right.

The number of working cam surfaces on the rotating cam plate 17 bears a definite relation to the number of pockets 18 in each circumferential series, such relation depending on the desired grouping of links in the chain. A common grouping of links is to have links alternating in groups of two, and with this grouping the total number of working high and low portions on the rotating cam plate 17 is one-half the number of pockets in each circumferential series if each pocket holds but a single link, as illustrated by the inner series of cams in Fig. 2. For different link groupings, the roller 29 may be reversed axially so as to coöperate with the outer series of cams, the pockets 18 may be of different depth, or different cylinders 15 with different numbers of pockets 18 may be substituted. If desired, in order to make the changing of link groupings more convenient, the cam plate 17, instead of being mounted directly on the projecting end of the rotating cylinder 15, may be mounted on a stub shaft 35 which is connected by gears 36 and 37 to such cylinder, as indicated in Fig. 6. Then any desired arrangement of link groupings can be obtained by merely substituting gear sets of different gear ratios for the gears 36 and 37.

In operation, the magazines 13 are filled in any suitable way with the links 14, and the cylinder 15 is rotated in the direction of the arrow (Fig. 2). As each pocket 18 comes under its associated magazine 13, the column of links 14 drops and the pocket takes off one link (or more as desired) from the bottom of the pile of links. This link is carried around in the pocket 18, being retained therein by the casing 12, until the discharge opening 19 is reached, whereupon the link is discharged through the discharge opening 19, the discharge being assisted by the discharging finger 21. As each link passes through the opening 19, it is discharged on to two of the stack rods 26, which project up through the pitch holes of the link, the spacing of the stack rods corresponding to that of the pitch holes. When the desired number of links from each magazine 13 has been discharged on to its particular pair of stack rods 26, this number being two in the arrangement shown in Fig. 1, the cam plate 17 shifts the rock shaft 25 axially toward the left, or permits the spring 27 to shift it axially toward the right, so as to bring a different pair of stack rods 26 under each magazine 13, one rod of this new pair being the same as one rod of the old pair but shifted to register with the other pitch hole. As soon as this shifting has been accomplished, the continued rotation of the cylinder 15 causes another group of the required number of links to be discharged from each magazine on to the new associated pair of stack rods, whereupon by the action of the cam plate 17 the shaft 25 and assembling comb are shifted in the opposite direction. This is continued, until the desired number of links is assembled on the assembling comb. These links are in the desired arrangement for the final chain, groups of links of any desired number being built up to form a composite whole in which the groups are positioned in the usual manner, with breaking joints. The links as they are placed on the stack rods 26 slide down such stack rods and pile up thereon on the upper surface 40 of a fixed plate 41 extending between the end pieces 10 and on the rounded upper surface 42 of the base 43 of a removable assembling rack composed of such base 43 and a second plate 44, which latter is suitably attached to the base 43 and is provided with a series of teeth 45 of proper spacing to extend between the ends of longitudinally alined links 14 of the assembled chain. The base 43 is provided with slots 46 in the planes of the respective stack rods 26, and the base 43 and plate 41 project close to the two sides of the assembling comb when the latter is tilted back to its full line position (Fig. 2). When desired, each slot 46 may be countersunk at the sides, so as to receive washers 47 such as are usually provided at the ends of the pivot pins which are to be received in the registering pitch holes of the assembled links. When the desired number of links have been piled up on the surfaces 40 and 42, with the points of the links toward the right (Fig. 2), the latch 32 is released and the rock shaft and assembling comb tilted forward, or from the full line to the dotted line position shown in Fig. 2, thereby bringing the points of the links into the notches between the teeth 45. Then the assembling plate formed by the base 43 and plate 44 may be removed by sliding it and the assembled links lengthwise of the stack rods 26 to disengage the links from the stack rods. Then the rock shaft 25 and assembling comb are tilted back to the full line position shown in Fig. 2, and latched by the latch 32, whereupon the assembling operation is repeated to get another properly assembled group of links. The assembled links on the assembling plate thus removed are in position to receive the pivot pins of the chain, which may be inserted, either by hand or otherwise, in the registering holes in such assembled chain. The same or another assembling plate may be put in place on the machine to receive the next group of assembled links which are assembled in proper relationship on the stack rods 26, as already described.

We claim as our invention:

1. An assembling device for chains, comprising a series of slide bars spaced apart to correspond with the pitch of the chain, a series of magazines for chain links, said magazines being spaced apart by distances corresponding to twice the pitch of the chain, and means for receiving links from said magazines and placing them on said slide bars, said last-named means and said series of slide bars being relatively shiftable longitudinally of the series so as to produce overlapping of the links on the slide bars.

2. An assembling device for chains, comprising a series of slide bars spaced apart to correspond with the pitch of the chain, a series of magazines for chain links, said magazines being spaced by distances corresponding to twice the pitch of the chain, a rotating cylinder for receiving links from said magazines and depositing them on said slide bars, said magazines and said series of slide bars being relatively shiftable axially of the cylinder to make different sets of slide bars coöperate with each magazine.

3. An assembling device for chains, comprising an assembling comb consisting of a series of slide bars each supported at one end and free at the other, said slide bars being spaced apart by distances equal to the pitch of the chain, and means for selectively placing links on said assembling comb so that the slide bars of such assembling comb project through the pitch holes of the links, said slide bars being arranged so that the links slide along them by gravity toward their supported ends.

4. An assembling device for chains, comprising an assembling comb consisting of a series of slide bars each supported at one end and free at the other, said slide bars being spaced apart by distances equal to the pitch of the chain, and means for selectively placing links on said assembling comb so that the slide bars of such assembling comb project through the pitch holes of the links.

5. An assembling device for chains, comprising an assembling comb consisting of a series of slide bars each supported at one end and free at the other, said slide bars being spaced apart by distances equal to the pitch of the chain, and means for selectively placing links on said assembling comb so that the slide bars of such assembling comb project through the pitch holes of the links, said slide bars being arranged so that the links slide along them by gravity toward their supported ends, said assembling comb and said placing means being relatively shiftable longitudinally of the series of slide bars to produce an overlapping of links on said slide bars.

6. An assembling device for chains, comprising an assembling comb consisting of a series of slide bars each supported at one end and free at the other, said slide bars being spaced apart by distances equal to the pitch of the chain, and means for selectively placing links on said assembling comb so that the slide bars of such assembling comb project through the pitch holes of the links, said assembling comb and said placing means being relatively shiftable longitudinally of the series of slide bars to produce an overlapping of links on said slide bars.

7. An assembling device for chains, comprising an assembling comb consisting of a series of slide bars each supported at one end and free at the other, said slide bars being spaced apart by distances equal to the pitch of the chain, means for selectively placing links on said assembling comb so that the slide bars of such assembling comb project through the pitch holes of the links, said slide bars being arranged so that the links slide along them by gravity toward their supported ends, and means operated by said placing means for producing a relative shifting between said placing means and said assembling comb longitudinally of the latter to produce overlapping of links on the assembling comb.

8. An assembling device for chains, comprising an assembling comb consisting of a series of slide bars each supported at one end and free at the other, said slide bars being spaced apart by distances equal to the pitch of the chain, means for selectively placing links on said assembling comb so that the slide bars of such assembling comb project through the pitch holes of the links, and means operated by said placing means for producing a relative shifting between said placing means and said assembling comb longitudinally of the latter to produce overlapping of links on the assembling comb.

9. An assembling device for chains, comprising a series of slide bars spaced apart to correspond with the pitch of the chain, a series of magazines for chain links, said magazines being spaced apart by distances corresponding to twice the pitch of the chain, a rotating cylinder for receiving links from said magazines and depositing them on said slide bars, and means operated by the rotation of said cylinder for producing a relative longitudinal shifting between said assembling comb and said cylinder to cause the cylinder to place links on the slide bar of said assembling comb in overlapping relation.

10. An assembling device for chains, comprising a series of slide bars spaced apart to correspond with the pitch of the chain, a series of magazines for chain links, said magazines being spaced apart by distances corresponding to twice the pitch of the chain, a rotating cylinder for receiving links from said magazines and depositing them on said slide bars, and means operated by the rotation of said cylinder for producing a relative longitudinal shifting between said assembling comb and said series of magazines to cause the cylinder to place links on the slide bar of said assembling comb in overlapping relation.

11. An assembling device for chains, comprising a series of slide bars spaced apart to correspond with the pitch of the chain, a series of magazines for chain links, said magazines being spaced apart by distances corresponding to twice the pitch of the chain, a rotating cylinder for receiving links from said magazines and depositing them on said slide bars, a cam operated by the rotation of said cylinder, and connections between said cam and said assembling comb for producing shifting of the assembling comb alternately in opposite directions by distances equal to the pitch of the chain.

12. An assembling device for chains, comprising a series of slide bars spaced apart to correspond with the pitch of the chain, a series of magazines for chain links, said magazines being spaced apart by distances corresponding to twice the pitch of the chain, a rotating cylinder for receiving links from said magazines and depositing them on said slide bars, a cam operated by the rotation of said cylinder, and connections between said cam and said assembling comb for producing shifting of the assembling comb alternately in opposite directions.

13. An assembling device for chains, comprising a series of slide bars spaced apart to correspond with the pitch of the chain, a series of magazines for chain links, said magazines being spaced apart by distances corresponding to twice the pitch of the chain, a rotating cylinder for receiving links from said magazines and depositing them on said slide bars, a cam operated by the rotation of said cylinder, and connections between said cam and said assembling comb for producing shifting of the assembling comb.

14. An assembling device for chains, comprising a series of slide bars spaced apart to correspond with the pitch of the chain, a series of magazines for chain links, said magazines being spaced apart by distances corresponding to twice the pitch of the chain, a rotating cylinder for receiving links from said magazines and depositing them on said slide bars, a cam operated by the rotation of said cylinder, and connections between said cam and said assembling comb for producing shifting of the assembling comb by unit distances equal to the pitch of the chain.

15. An assembling device for chains, comprising an assembling comb consisting of a series of slide bars each supported at one end and free at the other, said slide bars being spaced apart by distances equal to the pitch of the chain, means for selectively placing links on said assembling comb so that the slide bars of such assembling comb project through the pitch holes of the links, said slide bars being arranged so that the links slide along them by gravity toward their supported ends, and an assembly plate for holding links in the spaced relationship in which they are placed on said assembling comb, said assembling comb and assembly plate being relatively movable to deposit the links assembled on the assembling comb on to the assembly plate.

16. An assembling device for chains, comprising an assembling comb consisting of a series of slide bars each supported at one end and free at the other, said slide bars being spaced apart by distances equal to the pitch of the chain, means for selectively placing links on said assembling comb so that the slide bars of such assembling comb project through the pitch holes of the links, and an assembly plate for holding links in the spaced relationship in which they are placed on said assembling comb, said assembling comb and assembly plate being relatively movable to deposit the links assembled on the assembling comb on to the assembly plate.

17. An assembling device for chains, comprising an assembling comb consisting of a series of slide bars each supported at one end and free at the other, said slide bars being spaced apart by distances equal to the pitch of the chain, means for selectively placing links on said assembling comb so that the slide bars of such assembling comb project through the pitch holes of the links, said slide bars being arranged so that the links slide along them by gravity toward their supported ends, and an assembly plate for holding links in the spaced relationship in which they are placed on said assembling comb, said assembling comb being movable to deposit the links assembled thereon on to the assembly plate and to clear the free ends of the slide bars of the assembling comb.

18. An assembling device for chains, comprising an assembling comb consisting of a series of slide bars each supported at one end and free at the other, said slide bars being spaced apart by distances equal to the pitch of the chain, means for selectively placing links on said assembling comb so that the slide bars of such assembling comb project through the pitch holes of the links, and an assembly plate for holding links in the spaced relationship in which they are placed on said assembling comb, said assembling comb being movable to deposit the links assembled thereon on to the assembly plate and to clear the free ends of the slide bars of the assembling comb.

19. An assembling device for chains, comprising a series of slide bars spaced apart to correspond with the pitch of the chain, a series of magazines for chain links, said magazines being spaced apart by distances corresponding to twice the pitch of the chain, said magazines and said slide bars being arranged so that the links discharged by the magazines are received on the slide bars, and said series of slide bars and magazines being relatively shiftable longitudinally of the series so as to produce overlapping of the links discharged on to the slide bars from the magazines.

20. An assembling device for chains, comprising a series of slide bars spaced apart to correspond with the pitch of the chain, a series of magazines for chain links, said magazines being spaced apart by distances corresponding to twice the pitch of the chain, said magazines and said slide bars being arranged so that the links discharged by the magazines are received on the slide bars, and said series of slide bars and magazines being relatively shiftable longitudinally of the series alternately in opposite directions so as to produce overlapping of the links discharged on to the slide bars from the magazines.

21. An assembling device for chains, comprising a series of slide bars spaced apart to correspond with the pitch of the chain, a series of magazines for chain links, and means for receiving links from said magazines and placing them on said slide bars, said last-named means and said series of slide bars being relatively shiftable to produce overlapping of the links on the slide bars.

22. An assembling device for chains, comprising a series of slide bars spaced apart to correspond with the pitch of the chain, a series of magazines for chain links, a rotating cylinder for receiving links from said magazines and depositing them on said slide bars, said magazines and said series of slide bars being relatively shiftable to make different sets of slide bars coöperate with each magazine.

23. An assembling device for chains, comprising an assembling comb consisting of a series of slide bars each supported at one end and free at the other, said slide bars being spaced apart by distances equal to the pitch of the chain, and means for selectively placing links on said assembling comb so that the slide bars of such assembling comb project through the pitch holes of the links, said slide bars being arranged so that the links slide along them by gravity toward their supported ends, said assembling comb and said placing means being relatively shiftable to produce an overlapping of links on said slide bars.

24. An assembling device for chains, comprising an assembling comb consisting of a series of slide bars each supported at one end and free at the other, said slide bars being spaced apart by distances equal to the pitch of the chain, and means for selectively placing links on said assembling comb so that the slide bars of such assembling comb project through the pitch holes of the links, said assembling comb and said placing means being relatively shiftable to produce an overlapping of links on said slide bars.

25. An assembling device for chains, comprising an assembling comb consisting of a series of slide bars each supported at one end and free at the other, said slide bars being spaced apart by distances equal to the pitch of the chain, means for selectively placing links on said assembling comb so that the slide bars of such assembling comb project through the pitch holes of the links, and means operated by said placing means for producing a relative shifting between said placing means and said assembling comb to produce overlapping of links on the assembling comb.

26. An assembling device for chains, comprising a series of slide bars spaced apart to correspond with the pitch of the chain, a series of magazines for chain links, a rotating cylinder for receiving links from said magazines and depositing them on said slide bars, and means operated by the rotation of said cylinder for producing a relative shifting between said assembling comb and said cylinder to cause the cylinder to place links on the slide bar of said assembling comb in overlapping relation.

27. An assembling device for chains, comprising a series of slide bars spaced apart to correspond with the pitch of the chain, a series of magazines for chain links, a rotating cylinder for receiving links from said magazines and depositing them on said slide bars, and means operated by the rotation of said cylinder for producing a relative shifting between said assembling comb and said series of magazines to cause the cylinder to place links on the slide bar of said assembling comb in overlapping relation.

28. An assembling device for chains, comprising a series of slide bars spaced apart to correspond with the pitch of the chain, a series of magazines for chain links, said magazines and said slide bars being arranged so that the links discharged by the magazines are received on the slide bars, and said series of slide bars and magazines being relatively shiftable to produce overlapping of the links discharged on to the slide bars from the magazines.

29. An assembling device for chains, comprising a series of slide bars spaced apart to correspond with the pitch of the chain, a series of magazines for chain links, said magazines and said slide bars being arranged so that the links discharged by the magazines are received on the slide bars, and said series of slide bars and magazines being relatively shiftable alternately in opposite directions so as to produce overlapping of the links discharged on to the slide bars from the magazines.

In witness whereof, we have hereunto set our hands at Indianapolis, Indiana, this 21st day of April, A. D. one thousand nine hundred and sixteen.

OWEN H. SPENCER.
FRANK J. OAKES.

Copies of this patent may be obtained for five cents each, by addressing the "Commissioner of Patents, Washington, D. C."